United States Patent
Matt et al.

[15] 3,692,375
[45] Sept. 19, 1972

[54] COMPOSITE PLASTIC BEARING AND METHOD FOR MAKING THE SAME

[72] Inventors: Richard J. Matt, Simsbury; Thomas P. Rolland, Bristol, both of Conn.

[73] Assignee: Textron Inc., Providence, R.I.

[22] Filed: Dec. 1, 1970

[21] Appl. No.: 94,091

[52] U.S. Cl. .................308/238, 87/1, 138/144, 156/195
[51] Int. Cl. .................................F16c 33/14
[58] Field of Search ......308/238; 156/184, 190, 195; 87/1; 138/144, 129

[56] References Cited

UNITED STATES PATENTS

| | | | |
|---|---|---|---|
| 3,604,463 | 9/1971 | McLarty | 138/144 |
| 3,635,256 | 1/1972 | McLarty | 308/238 X |
| 3,533,668 | 10/1970 | Tunis | 308/238 |
| 2,953,418 | 9/1960 | Runton et al. | 308/238 |
| 2,862,283 | 12/1958 | Rasero | 308/238 |
| 3,000,076 | 9/1961 | Runton et al. | 308/238 |
| 3,053,592 | 9/1962 | Runton et al. | 308/238 |
| 3,328,100 | 6/1967 | Spokes et al. | 308/238 |
| 1,900,298 | 3/1933 | Morris | 308/238 X |
| 2,783,173 | 2/1957 | Walker et al. | 156/190 |
| 2,815,043 | 12/1957 | Kleiner et al. | 156/195 X |
| 2,932,597 | 4/1960 | St. John et al. | 156/190 |
| 3,294,609 | 12/1966 | Foll | 156/190 |

OTHER PUBLICATIONS

Kirk–Othmer, Ency. of Chem. Tech., 2d Ed., 1968, pg. 29 et al.

*Primary Examiner*—Martin P. Schwadron
*Assistant Examiner*—Barry Grossman
*Attorney*—Sandoe, Hopgood and Calimafde

[57] ABSTRACT

The invention contemplates an improved composite plastic sliding bearing or bearing element, and method and apparatus for making the same, wherein a fabric liner at a generally tubular bearing interface is backed by a particular reinforcement of tensed flexible strands which are embedded in a hard mass of bonding material. High radial-compression load on the bearing is stoutly resisted by the reinforcement which comprises interlaced winding traverses at different helical-advance angles.

19 Claims, 6 Drawing Figures

INTERLOCKED, INTERLACED, 1ST, 2ND, & 3RD TRAVERSE

PATENTED SEP 19 1972
3,692,375
SHEET 1 OF 2
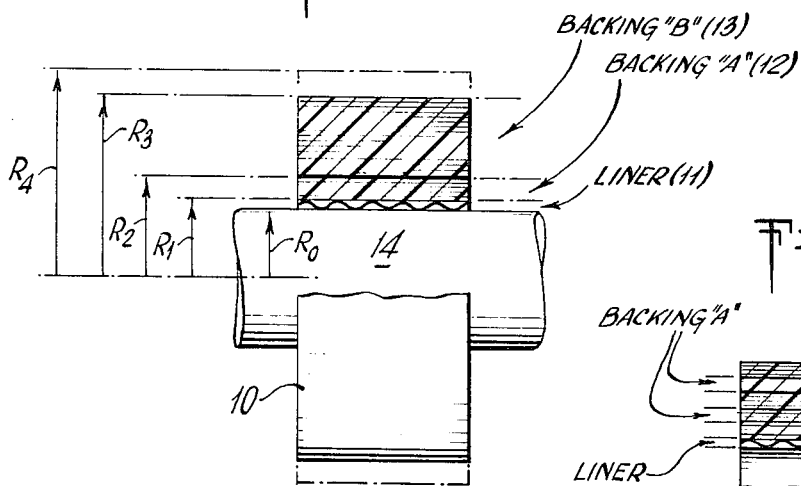
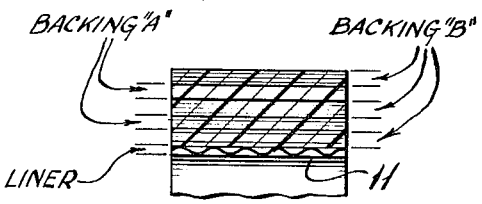
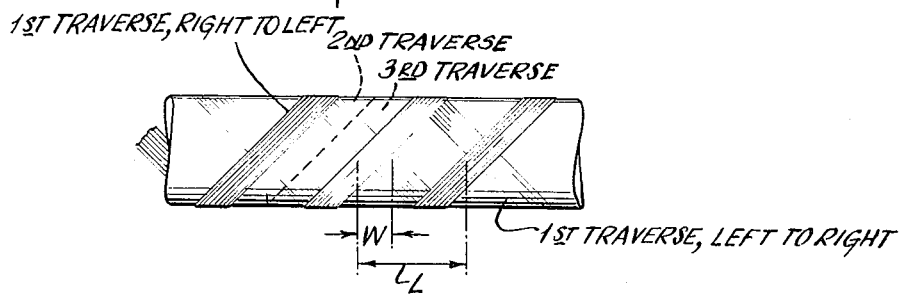
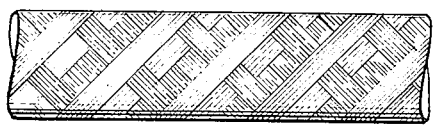
INTERLOCKED, INTERLACED, 1ST, 2ND, & 3RD TRAVERSE
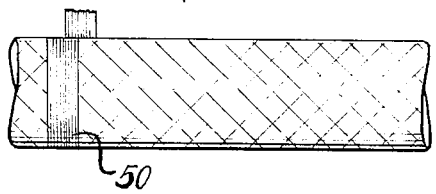
INVENTORS
RICHARD J. MATT
THOMAS P. ROLLAND
BY
Sandoe, Hopgood & Calimafde
ATTORNEYS

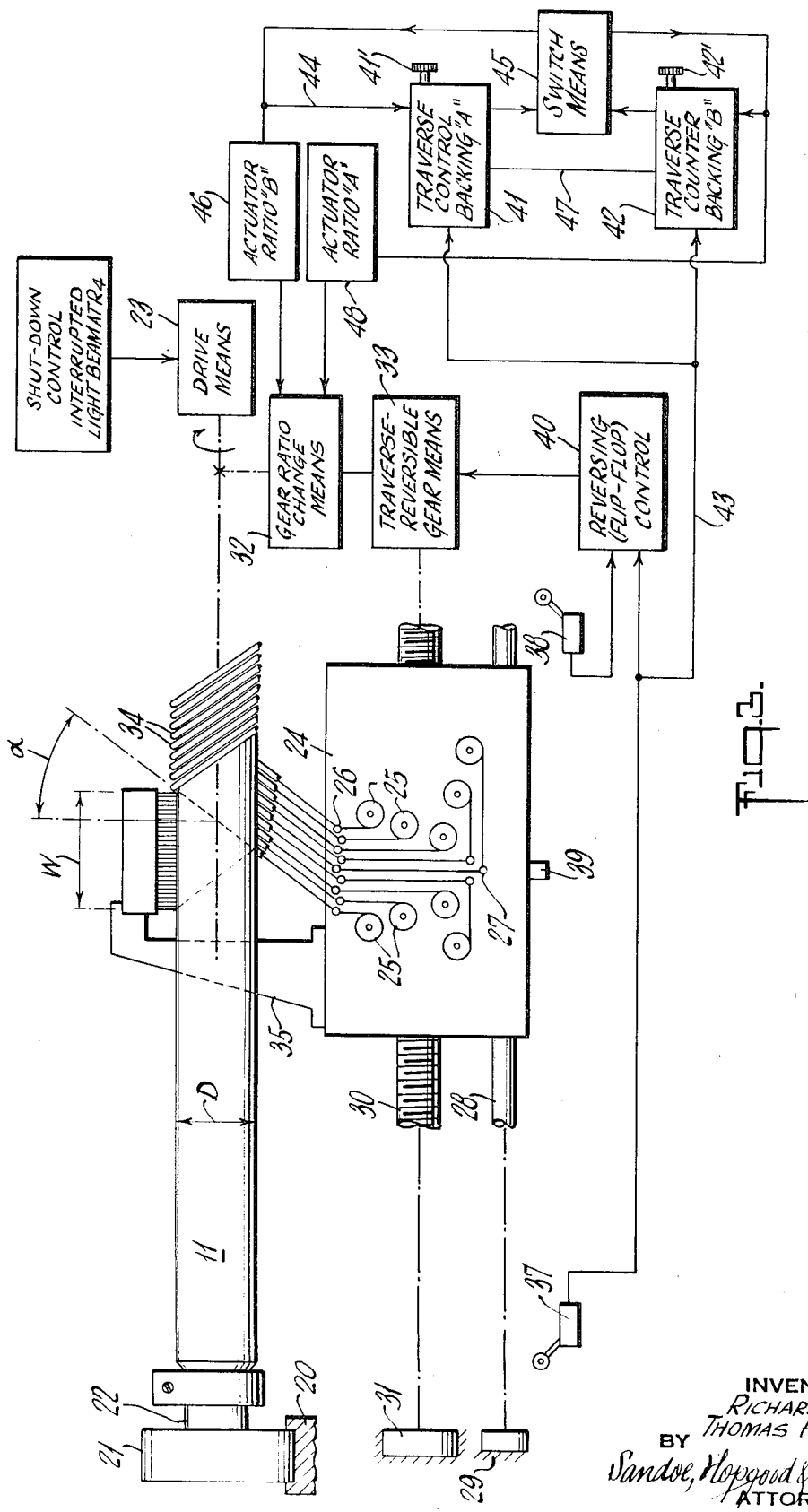

COMPOSITE PLASTIC BEARING AND METHOD FOR MAKING THE SAME

This invention relates to fabric-lined bearings or bearing elements and to methods of making the same. More particularly, the invention is concerned with such bearings in which the lining and a circumferential envelopment of filamentary reinforcement, or backing, are embedded in and bonded to a hard resinous bonding material. The bearings or bearing elements of the invention involve sliding rotational surfaces at an interface, which may or may not be cylindrical and which is therefore termed generally tubular of generally cylindrical.

Techniques are known for producing composite plastic bearings with low-friction fabric liners, and in journal-bearing application of such bearings it is convenient to form the bearing on a cylindrical mandrel which can be removed, and then reused, to make more bearings or bearing elements. Such techniques are disclosed, for example, in U.S. Pat No. 3,507,022. Such techniques have, however, ignored the problems presented by high radially directed compressional loading, and they have not provided the simplicity needed for mass-production of high-capacity, high-quality products, at relatively low cost. For example, in bearings wherein woven fabric is relied upon for reinforcement of the liner, there is a tendency to undergo deformation under load; that is, the liner tends to cold flow and be displaced (hydrodynamically) out the ends of the bearing, thereby resulting in excessive clearance and wear.

It is, accordingly, an object of the invention to provide an improved article of the character indicated, as well as an improved method and apparatus for making the same.

Another object is to achieve the above object for an inherently high-capacity bearing, at relatively low cost.

A further object is to provide a bearing element, and a method and apparatus for making the same, wherein an inherent capacity exists for greater life, for a given load utilization.

A specific object is to achieve the foregoing objects with an article, method and apparatus lending themselves to economy in the use of low-friction liner material.

Another specific object is to provide bearing elements of the character indicated, having improved resistance to distortion under load.

A further specific object is to achieve the stated objects with apparatus and a method lending themselves to selective manufacture of a plurality of different sizes and types of bearing.

Other objects and various further features of novelty and invention will be pointed out or will occur to those skilled in the art from a reading of the following specification, in conjunction with the accompanying drawings. In said drawings, which show, for illustrative purposes only, preferred forms and methods of the invention:

FIG. 1 is a view in side elevation, partly broken-away and in vertical section to show a bearing element of the invention;

FIG. 2 is a fragmentary vertical sectional view to show a modified bearing element;

FIG. 3 is a simplified and schematic diagram of apparatus of the invention, for making bearing elements, as in FIGS. 1 and 2; and FIGS. 4, 5 and 6 are similar fragmentary views in elevation to illustrate different steps in making bearings of the invention.

According to the invention, an improved composite plastic sliding bearing or bearing element, and method and apparatus for making the same, are provided wherein a fabric liner at a generally tubular bearing interface is backed by a particular reinforcement of tensed flexible strands which are embedded in a hard mass of bonding material. High radial-compression load on the bearing is stoutly resisted by the reinforcement which comprises interlaced winding traverses at different helical-advance angles.

Referring to FIG. 1 of the drawings, the invention is shown in application to a journal bearing element or sleeve 10 comprising a fabric liner 11 and one or more layers 12–13 of reinforced backing, circumferentially surrounding and retaining the liner 11. The various layers 11 12–13 may be embedded and bonded in a single hard resin material, such as an epoxy, and therefore the same plastic cross-hatching is employed to show the section for all layers. The bore of the liner 11 has rotational or other sliding fit to a shaft 14; the inner concave surface of the liner 11 thus defines the bearing interface.

The liner fabric 11 may be of various forms. Thus, it may be a woven low-friction fabric as in said U.S. Pat. No. 3,507,022, or it may be a stretched low-friction braided fabric or sock as disclosed in Van Dorn, et al. application (Attorney File 025), filed on even date herewith. It may also be a knitted fabric, or it may be the result of helically winding low-friction and bondable fibers or strands in a first direction of traverse, with an overlapping return traverse of the same kind of winding, as will later be more clear. It suffices to say that for a low-friction liner fabric 11, the mix of fibers, filaments, strands or yarns is preferably a polyfluorocarbon such as Teflon, and a polyamide such as Nomex, with possibly a small component of Dacron, in view of the shrinking capabilities of the latter under the curing conditions for certain impregnating resinous bonding materials.

The backing for liner 11 is shown as Backing "A" (layer 12) and Backing "B" (layer 13) in order to permit separate identification, although the same flexible reinforcing strands, filaments or yarns may be used in both layers 12–13. Glass fiber is preferred as such reinforcing material, and in accordance with the invention the various layers 12–13 differ from each other in the magnitude of helical-advance angle which characterizes the development of reinforcing material in the respective layers 12–13. The different helical-advance angles at particular layers are selected for achieving a primarily radially compressive or circumferentially retaining reinforcement of the one hand, or a primarily axially retaining or end-wall reinforcement on the other hand. Choice of the order and nature of these angles and layers will depend inter alia upon the type of liner and on the proportions of the cross-section of the particular bearing element. Generally, however, we prefer to introduce the large-angle helix winding as the initial back-up winding, or at least as close as practical to the liner 11, for reasons of providing greatest axial retention of liner fiber at the bearing interface.

Thus, for example, for a liner fabric 11 which is woven fabric on the bias (i.e., oriented on the bias, in the sense of the circumferential wrap), or other biased forms (such as braided fabric, or high-pitch helical wraps), the first backing layer 12 is primarily circumferential in nature and is relatively thin; this entails but a few traverses of a relatively small or low-angle helical advance, thereby providing maximum cross-over of individual strands of the bias-oriented liner material. Having thus positioned the liner material, the second backing layer 13 is preferably characterized by such a large angle of helical advance of reinforcing strands that there is (a) maximum cross-over of individual strands of the layer 12 and (b) a substantial component of axially retaining action, and successive courses of winding the reinforcing material are preferably phased for maximum interlace, for greater stabilizing effect.

By the same token, for a liner fabric 11 in which orthogonally coursed threads are oriented in the circumferential and longitudinal directions, respectively, the adjacent backing layer 12 is preferably characterized by a relatively large helical-advance angle, followed in alternation by successive further layers of interlaced small and large advance-angle helices. Such a development is suggested in FIG. 2, wherein the legend "Backings 'A'" identifies plural layers of low-angle helix reinforcement, radially interlaced with "Backings 'B'" of large-angle helix reinforcement.

In making bearing elements as in FIGS. 1 or 2, a core element or mandrel is selected, with outer convex contour as desired for the bearing interface. For FIG. 1, the shaft 14, of radius $R_0$, may be considered as the core or mandrel; it may be characterized by a low-friction or non-bondable surface or it may be coated with a wax, silicone or other parting agent for the same purpose. The liner 11 is next applied, by winding, circumferential wrapping, or axial stretching, depending on its nature; this develops to a new radius $R_1$. Liner 11 may be preimpregnated or wetted with the hardenable bonding material, as after wringing-out and drying to the B-stage (pliable) of the bondable material; however, we prefer to apply the bondable material in its liquid phase just prior to, in the course of, or just after applying liner material to the core or mandrel. The reinforcing layers are then developed as windings (different helix angles) of the same reinforcing threads or strands, the winding being wetted with more liquid-phase bonding material, in the course of winding. As shown, layer 12 develops to a radius $R_2$, and the outer layer 13 is developed to a radius $R_4$ which exceeds that ($R_3$) desired in the finished product. The liquid-impregnated wound assemble (radius $R_4$) is then preferably enveloped, as with a foil wrap, to retain the liquid of the bondable material, and for convenience in handling in the curing environment. Once cured to hardness, the foil wrap and the outer surface are removed, in turning, grinding or other finishing operations to radius $R_3$. The axial ends are also cut and faced to desired dimensions and profile, as after removal from the core or mandrel.

FIG. 3 illustrates apparatus that is particularly useful in producing a long sleeve from which separate bearing elements 10 may be cut. The machine applies the reinforcement strands in interlaced layers, as desired, and with preselected conditions determining the different angles of helical advance. The machine uses a frame which is schematically shown by various shaded regions of reference thereto, as at 20 for a rotary bearing 21. The long bearing sleeve is developed on a mandrel 22, revolubly supported by means 21 and connected for drive by means 23. Clamp means 19 at one or both ends of the mandrel provides anchoring end-reference for the sock or other material of the liner 11. Filament-supply means 24 is provided with a plurality of upstanding supports or spindles for individual yarn bobbins 25 for the reinforcing strands or yarns, and guides such as eyes or rings 26–27 position the individual strands, as necessary, as to present a closely adjacent longitudinally spaced array, for plural pay-out in developing the helical wrap; preferably, the pay-out is under tension, and the schematic showing at eyes 26 will be understood as illustratively incorporating a tension-drag feature, as produced by a spring-loaded shoe constituting part of the structure of each pay-out eye 26.

The filament-supply means 24 may be fixed, and the rotating mandrel may be traversed to the right and left to produce such wrap; however, in the form shown, it is the mandrel 22 which is held while the filament-supply means 24 is a traversed slide or carriage. For this purpose, guide means 28 is frame-referenced at 29 and assures that motion of the filament-supply means will be parallel to the rotary axis of mandrel 22. A lead-screw 30 schematically depicts the means for traverse-feeding the filament-supply means 24. Screw 30 has threaded engagement with a follower nut (not shown) forming part of the carriage 24; a rotary thrust bearing 31 is shown as a means for establishing frame-referenced support of screw 30, and drive is from means 23, by way of change-gear 32 and reversing-gear means 33. Thus, for a given drive at 23, and for given gear selections at 32–33, the carriage 24 will have a definite traverse rate and direction, determining a particular helical angle $\alpha$ of advance of strand wrap, for a particular built-up diameter D of the partially loaded mandrel. For the instant depicted in FIG. 3, the angle $\alpha$ is in the order of 45°, and the clustered spread W of payed-out and enwrapping reinforcing threads 34 substantially matches the helical advance lead per turn, thus assuring smooth, continuous longitudinal interlace of the helices of the individual threads. Actually, the spread W of the plural threads 34 is exaggerated, for clarity of drawing, and it will be appreciated that for the angle $\alpha$ of the indicated magnitude, the spread W will be but a fraction of the advance lead L per turn, as is apparent in FIG. 4, to be later discussed. However, for a different gear selection at 32, wherein lead-screw rotation is at a slower pace, the spread W may substantially match the lead L because the angle $\alpha$ of helical advance will have been so materially reduced that the reinforcing thread wrap is essentially or primarily circumferential; such a wrap has commenced, from left-to-right in FIG. 6 (at 50), to be later discussed.

The carriage 24 is shown further equipped with a bracket 35 for positioning a reservoir and brush applicator 36 in wetting contact with the instantaneous path of wrap on the mandrel; reservoir 36 will be understood to contain and dispense a supply of liquid-phase bonding material. Alternatively, we may use a resin cup through which the individual threads are drawn, to wet the threads with bonding material just prior to wrapping on the mandrel.

The remainder of FIG. 3 is suggestive of automatic operation in accordance with the invention. Frame-mounted limit switches 37–38 are positioned for coaction with a lug 39 on the carriage 24, to determine the respective traverse limits. Each of these switches has a connection to reversing-control means 40, which may include a flip-flop with a control connection to the reversing-gear means 33. Thus, upon operation of switch 37, control 40 is shifted from its first to its second state, to initiate at 33 a reversed drive of the lead-screw 30 (without changing the gear ratio at 32); similarly, upon attainment of the other traverse limit, the switch 38 is operated, to shift control 40 back to its first state, and to again reverse gear means 33, back to the direction for right-to-left traverse feed.

In addition to the indicated automatic reversal of traverse, the circuit of FIG. 3 is seen to include a counter 41 for the number of traverses needed in Backing "A" and a similar counter 42 for the number of traverses needed in Backing "B"; manual means 41' and 42' will be understood to afford selective determination of such numbers. Each of counters 41–42 has an input connection 43 from the limit switch 37, thereby enabling a one-count counter index for each completed traverse cycle (to the right, and return to the left). In that part of the operation in which Backing "A" is being generated, the counter 41 will have been enabled (as will later be clear), and the count proceeds as the winding builds to the extent selected by adjustment at 41'. Upon attaining this extent, counter 41 produces an output signal to change the state of switch means 45, thereby (a) controlling an actuator 46 for shifting the gear-change means 32 to a new gear ratio, appropriate for generation of the helical-advance angle desired in Backing "B", and (b) imparting a disabling pulse at 44 to counter 41; an interlock connection 47 between counters 41–42 assures the enabling of one counter 42 (41) upon the disabling of the other 41 (42). The count and winding for Backing "B" can now proceed, without interrupting the continuous rotation of the mandrel and pay-out of wrapping strands 34. When BAcking "B" has built to the desired number of traverse counts (preselected at 42'), switch means 45 is operated to control actuator 48 for gear shift at 32 back to the ratio for further Backing "A" winding development; also, a signal at 49 disables counter 42 and, through interlock 47, reinstates the operative counting function at 41 for a Backing "A" winding. Such layer development recycles until the desired full diameter (radius $R_4$) is reached, whereupon the machine may be shut down manually, or automatically, as by photocell detection of an interrupted light beam, in disconnect relation with the drive means 23 (see legend); alternatively, the shut-sown control may be a counter, operative to shut-off drive means 23 after completion of a preselected number of winding traverses.

FIGS. 4, 5 and 6 illustrate the pattern of winding development produced by the machine of FIG. 3. In FIG. 4, a first large helix-angle winding has begun, with a strand spread W which is only a small fraction of the helix lead L. The space between the applied strands of the first traverse should be filled by successive traverses, as by suitably spaced set-up placement of the limit switches 37–38. For example, if the helix angle is such that W approximates one-fourth of L, then switch 38 should be so spaced from switch 37 as to represent a given number of full helix turns, plus one-eighth of a turn (45° of a helix turn). This means that each successive traverse of the mandrel in a given direction (e.g., left to right) will lay down strands 34 along a path adjacent to but not overlapping the previous path. Legends for the second and third traverses illustrate such phase shift (90°) for each traverse; and the fourth traverse, of course, fills the one remaining swath space, to present the appearance shown in FIG. 5. In FIG. 6, it is assumed that the large-angle helix winding has been completed and that the pre-selected count limit has caused gear-shifting to the ratio for a circumferential winding (low helix angle); the winding 50 is shown proceeding at such low angle of helical advance.

It has been generally indicated that the fabric liner 11 may be the product of reversing-traverse winding, as produced by the machine of FIG. 3. Thus, the above discussion of FIGS. 4 and 5 may be taken to apply for generation of the liner 11, the supply spools 25 being provided of course with yarn material or strands appropriate to the desired composition at the bearing interface. For low-friction interface, each strand 34 may, for example, be a like combined mix of Teflon, Nomex, and Dacron filaments; or adjacent strands may be of differing composition, all to the end that the desired mix is available at the interface. Having completed the four right and four left traverses needed to cover the mandrel (as in FIG. 4) and to impregnate the resulting fabric liner 11, the reinforcing windings are developed as previously described; this may be accomplished b relocating the partially wound mandrel on another FIG. 3 machine which is set up for winding with reinforce material, or a second deck of carriage 24 (or a second carriage 24) appropriately loaded with and for pay-out of reinforce material may enable use of the same machine for all winding.

It will be seen that the invention meets the stated objects and provides a superior product at low cost. Great flexibility is afforded as to size and configuration of bearing element, and as to yarn or strand composition at the various layers. The liner strands may comprise a plurality of polyfluorocarbon filaments intertwined with filaments of one or more resin bondable fibrous materials. The term polyfluorocarbons includes polymers and copolymers of ethylenically unsaturated fluorine containing monomers such as polytetrafluoroethylene, amylidine fluoride, chlorotufluoroethylene and hexafluoropropylene. The distinguishing characteristic of these polyfluorocarbon polymers and copolymers is their low surface energy which gives these materials self-lubricating properties when in rubbing or sliding contact with hard materials such as metal. Preferably the polyfluorocarbon is tetrafluoroethylene (Teflon). Such polyfluorocarbon fibers are resin bondable only with difficulty; hence to provide a suitably rigid bearing liner they are usually intertwined with resin bondable fibers such as cotton, rayon, dacron, or any of the various nylons. Because of its strength, high-temperature nylon (Nomex) is particularly preferred; also, as indicated above, the Nomex does not materially degrade the low-friction performance attributable to the Teflon, and it assures that the Teflon will be held in place. Use of etched Teflon yarn also improves bondability and place-retention of the Teflon, a suitable such yarn being available in 400/16/3, where 400 is the denier, 16 is the number of ends, and 3 is the number of twists per inch.

The hardenable bonding material may be an epoxy resin or a phenolic or the like. The angle of helical advance will vary from one situation to another, but generally it may be stated that the "circumferential" wraps involve helical lead angles in the range 0 to 10°, whereas the large-angle wraps involve helical lead angles in the range of 30° to 75°. By interlacing the reverse-traversed laps of such windings, we have found that superior deformation resistance is imparted to the final product, regardless of the fractional amount of winding that is left, upon cut-off from a long cured sleeve.

In a typical example utilizing the invention, a plurality of sleeve-bearing elements 10 is produced by generating and curing a long sleeve, with impregnated multiple windings, described as follows:

Long sleeve length: 40 inches
Long sleeve built contour ($R_4$): 0.618 inch
Mandrel radius ($R_0$); 0.500 inch
Lining 11: 30 percent TFE, 70 percent Nomex, 0.018-inch thick
Backing "A": 0.015 inch (one layer or five passes), at 45° helix
Backing "B": 0.085 inch (two layers or four passes), circumferential wrap
Bonding material: epoxy, cured and thermally stabilized
Finished bearing cut-off intervals: 10 inches
Finished bearing width; 0.5 inch to 10 inches, as desired
Finished bearing outer profile ($R_3$); $1.1250/_2$ + 0.5625 inch While the invention has been described in detail for the preferred bearing elements, methods and apparatus shown, it will be understood that modifications may be made without departure from the invention.

What is claimed is:

1. A bearing element of generally tubular configuration having concave inner and convex outer surfaces substantially concentrically disposed, said bearing element comprising:
    a. an inner liner formed of interlaced strands of yarn and having a tubular configuration generally corresponding to that of the inner surface of said bearing, at least some of said strands comprising a plurality of low-friction filaments intertwined with filaments of at least one resin-bondable fibrous material wherein said low-friction filament containing strands are so disposed that at least some of said low-friction filaments are exposed at said inner bearing surface; and
    b. a rigid concentric backing for said liner, the inner surface of said backing being bonded to the outer surface of said liner, said backing comprising a cured hardenable resin having imbedded therein a plurality of interlacingly wound resin-bondable reinforcing fiber layers wherein at least some of said layers are helically wound and wherein the helix angle of one of said helically wound layers is substantially different from that of an adjacent other of said helically wound layers.

2. A bearing element in accordance with claim 1 wherein said reinforcing fiber layers comprise a layer of relatively small helix angle substantially coaxially interlaced with a plurality of layers of relatively great helix angle.

3. A bearing element in accordance with claim 1, wherein said reinforcing fiber layers comprise a layer of relatively great helix angle substantially coaxially interlaced with a plurality of layers of relatively small helix angle.

4. A bearing element in accordance with claim 1, wherein said reinforcing fiber is glass fiber.

5. A bearing element in accordance with claim 1, wherein said resin is an epoxy resin.

6. A bearing element in accordance with claim 1, wherein said low-friction filament is polytetrafluoroethylene.

7. A bearing element according to claim 6, wherein said low-friction filament is of the etched variety.

8. A bearing element in accordance with claim 1, wherein said resin-bondable fibrous material is a polyamide.

9. A bearing element in accordance with claim 1, wherein said polyamide is poly-E-caprolactam.

10. A bearing element in accordance with claim 1, in which said inner liner comprises a helical progression of plural strands of resin-bondable material and of low-friction material, characterized by at least one direction of helical advance in which said plural strands are located at a fraction of the area of said surface and by an overlapping and opposite direction of helical advance in which remaining portions of said plural strands are located at a remaining fraction of the area of said surface.

11. The method of making a bearing element of generally tubular configuration and with concave inner and convex outer surfaces substantially concentrically disposed, which method comprises selecting a hard elongated central core member with a convex outer surface of the size and configuration desired for the inner surface of the bearing element, circumferentially enveloping said core member with flexible low-friction fabric material, helically winding over said material a plurality of strands of a reinforcing material to which hardenable-liquid bonding resin material is bondable, said winding comprising a plurality of traverses of said core member in both longitudinal directions using substantially different helical-advance angles on different traverses of said core member, said reinforcing material and said fabric material being impregnated with said bonding material, whereby fibers of the fabric material and of said reinforcing material are embedded in hardenable material, and curing the hardenable material to hardness.

12. The method of making a plurality of bearing elements of generally tubular configuration and with concave inner and convex outer surfaces substantially concentrically disposed, which method comprises selecting a mandrel of length exceeding the combined axial widths of the desired plurality of bearing elements and of diameter matching the desired inner bearing surface, circumferentially enveloping said mandrel with flexible low-friction fabric material, helically winding over said material a plurality of strands of a reinforcing material to which hardenable-liquid bonding resin material is bondable, said winding comprising a plurality of traverses of said mandrel in both longitudinal directions using substantially different helical-advance angles on different traverses of said mandrel, said reinforcing material and said fabric material being impregnated with said bonding material, whereby fibers of the fabric material and of said reinforcing material are embedded in hardenable material, curing the hardenable material to hardness, and severing separate bearing elements by radial-plane cutting of the hardened mass at substantially bearing-unit intervals.

13. The method of claim 12, in which said helical winding step is performed by use of different helical-advance angles on different traverses of said mandrel.

14. The method of claim 12, in which one of said helical-advance angles is characterized by relatively small longitudinal advance per wrapped turn and in which the other of said helical-advance angles is characterized by a longitudinal advance per turn that is substantially the wrapped diameter of the turn.

15. The method of claim 12, in which one of said helical-advance angles is so small as to effect substantially circumferential envelopment of said fabric material, and in which the other of said helical-advance angles is so large as to effect a substantial component of longitudinal elongation the envelopment of said fabric material.

16. The method of claim 15, in which successively built-up layers of reinforcing material are comprised of groups of traverses at one helical-advance angle interlaced with groups of traverses at the other helical-advance angle.

17. The method of claim 12, in which said strands are wound under tension.

18. The method of claim 12, in which said mandrel has a non-resin-bondable outer surface.

19. The method of claim 12, in which the plural reinforcing strands are in close longitudinally adjacent array as they are helically wound.

* * * * *

UNITED STATES PATENT OFFICE
CERTIFICATE OF CORRECTION

Patent No. 3,692,375    Dated September 19, 1972

Inventor(s) RICHARD J. MATT, ET. AL.

It is certified that error appears in the above-identified patent and that said Letters Patent are hereby corrected as shown below:

In the drawing, in Figure 3, the rectangular box immediately above and to the left of threads "34" should be labelled with reference numberal 36.

Signed and sealed this 13th day of August 1974.

(SEAL)
Attest:

McCOY M. GIBSON, JR.    C. MARSHALL DANN
Attesting Officer    Commissioner of Patents